Jan. 4, 1955 A. H. SCHUTTE 2,698,740
SOLIDS FLOW REGULATOR
Filed Nov. 19, 1949
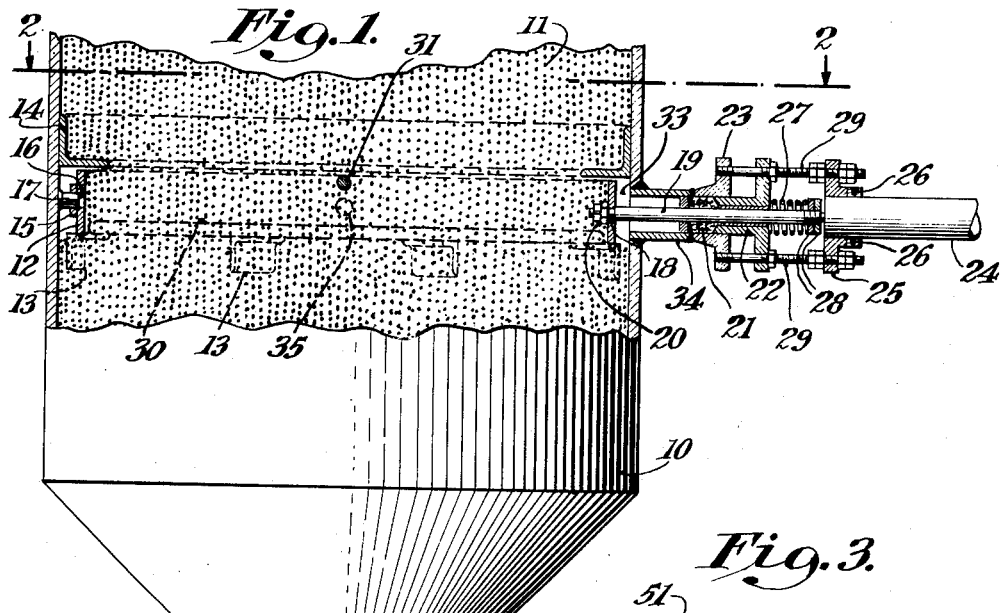
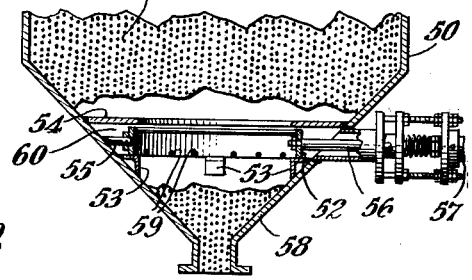
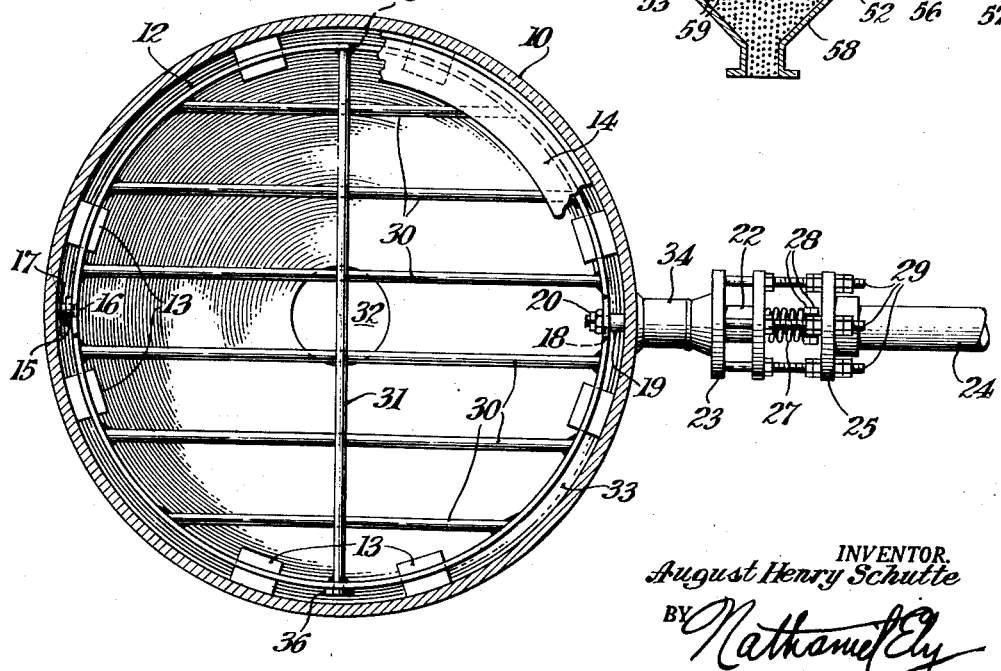
INVENTOR.
August Henry Schutte
BY Nathaniel Ely
ATTORNEY

United States Patent Office 2,698,740
Patented Jan. 4, 1955

2,698,740

SOLIDS FLOW REGULATOR

August H. Schutte, Hastings-on-Hudson, N. Y., assignor to The Lummus Company, New York, N. Y., a corporation of Delaware Application November 19, 1949, Serial No. 128,463

1 Claim. (Cl. 259—113)

This invention relates to an apparatus and method for promoting the flow of particle-like materials.

Published data by various workers in the field of solids flow mechanics in gravity packed beds of granular solids show that where a relatively large reactor or vessel is being served by a small bottoms draw-off line, non-uniform solids flow will result over a greater portion of the vessel. With most of the materials usually encountered, such as catalysts, contact coke, and so forth, the active submerged flow angle within the bed is about 17° with the vertical axis; in other words uniform flow is obtained only within the total angle of 34° extending upward from the draw-off connection.

As a result of this characteristic of flowing solids, the solids draw-off design for large vessels has involved the use of a multiplicity of draw-off lines or a multiplicity of properly spaced orifice plates as in T. C. C. reactors.

Such devices are expensive because they not only are complex and must be accurately fabricated but they also have to support the entire weight of the bed above the draw-off point, which in the case of most commercial designs, amounts to hundreds of tons of material.

My invention eliminates these difficulties by providing a means for rapid movement or vibration transverse to the direction of flow of the gravity-flowing particles and properly spaced above the bottom draw-off outlet. This produces an opening or flattening of the submerged flow angle. An upper annular restriction is provided to feed the particles into a vibrating tray mounted below this ring and supported by angle clips or supports welded to the shell. The diameter of the vibrating tray is less than that of the vessel so that a free lateral movement of the tray, as by an outside air cylinder, will cause lateral motion of the particles flowing therethrough. The tray is made of bars of wide enough spacing so that the tray does not support the flowing material. Solids flow may be controlled in the bottom draw-off line and the entire bed is gravity packed.

It is thus possible to produce excellent flow-conditions in a large bed with a minimum of difficulty and to eliminate the extra expense of a complex draw-off. It will be apparent that this solids flow regulator may be operated either continuously or intermittently.

Objects and advantages of my invention will appear from the following description of a preferred form of embodiment thereof taken in connection with the attached drawing illustrative thereof and in which:

Fig. 1 is a vertical sectional view of an apparatus embodying the solids flow regulator.

Fig. 2 is a horizontal sectional view taken substantially on the line 2—2 of Fig. 1.

Fig. 3 is a vertical sectional view of a modified apparatus embodying the solids flow regulator.

In accordance with the preferred form of embodiment of my invention, Fig. 1 shows a vertically extending bin 10 containing a bed of gravity-packed granular solids or particle-like material 11. An annular, vertically extending ring 12 of smaller diameter than bin 10 is freely supported in the bin by angle-supports 13, shown secured to bin 10, in such a manner that ring 12 will be in a horizontal plane. Immediately above ring 12 is located an annular angle-ring 14 secured to the bin 10 and having its inner diameter smaller than the diameter of ring 12. It has been found desirable to make the diameter of ring 12 approximately 85% to 90% of the diameter of bin 10. This will be modified depending on the size of the bin 10.

Ring 12 has a reinforced portion 15 containing a hole 16 which is adapted to surround pin 17. Pin 17 is secured to bin 10 and ring 12 is adapted to move radially in the plane of the axis of said pin. Diametrically opposite hole 16 is a second hole 18 through which is passed a shank 19. Shank 19 is detachably secured to ring 12 by nut 20.

Shank 19 extends through nozzle 34 in the shell of bin 10 and is mounted reciprocatingly therein by gland 22 and packing 21. Gland 22 is secured to flange 23. The cylinder of an air hammer 24 is detachably secured to flange 25 by set-screws 26. The external end of shank 19 is designed to fit the internal recess in the barrel of the air hammer.

By loosening bolt 20 it is possible to withdraw shank 19 from ring 12 which may then be rotated through 90° in the horizontal plane. In this rotated position, the reinforced portion 36 of the ring will then be superposed over pin 17 and the diametrically opposite hole 35 will be in line with shank 19. Nut 20 may then be secured to shank 19 and the apparatus is then ready to function in this second position.

Surrounding shank 19 is spring 27 one end of which seats against gland 22 while the other end rests against locknuts 28. Flange 25 and gland 22 are adjustably secured to flange 23. It is possible to vary the tightness of the gland and the relative distances of the gland and flanges by means of studs 29 and its attendant bolts.

Transversely extending across bin 10 are a plurality of rods 30 which are secured to ring 12. The diametrically located rod 31 is also shown secured to ring 12. Rods 30 may be secured to rod 31 if desired. Rods 30 and 31 may be inserted into holes in ring 12 or they may be welded to the inside of the ring. Rods 30 will normally be situated either perpendicular to or parallel to the direction of vibration. Where the particles are strong, rods 30 will be placed perpendicular to the direction of vibration. Where the particles are frangible and might possibly be crushed or broken by the force of the movement of rods 30 in the perpendicular position, the ring will be rotated through 90° to the second position. In this arrangement vibration is imparted to the particles by friction along the bars and there is substantially no impact on the particles.

The complete apparatus is secured in said bin properly spaced above the bottom draw-off 32. Under normal conditions this will be sufficiently close to the bottom of the bin to be within the cone of normal flow.

In a large vessel where it might not be practicable to discharge the entire flowing mass using a single tray as shown in Figs. 1 and 2, the regulator can be placed at a point of diminished cross-section as shown in Fig. 3. In Fig. 3, a vessel 50 is shown having a conical bottom 58. Particles 51 flow downwardly through vessel 50 to ring 54 at which point the cross section area is decreased to provide a particle free space 60. Ring 52 is shown resting on supports 53. Shank 56 connects ring 52 to the cylinder of air hammer 57. Pin 55 guides ring 52 as before. Bars 59 are shown in Fig. 3 perpendicular to the direction of vibration.

For large vessels, it is possible to utilize a center post supporting the inner ends of a series of sector-shaped trays. Each of these trays may have its separate vibrating means along the circumference of the vessel.

In operation bin 10 is gravity-packed full of a particle-like material which is continuously fed in from a higher point in the bin and which is removed from a bottom draw-off 32. These particles flow downwardly through bin 10 to the ring 14 at which point the cross-sectional area of flow is decreased to provide a particle-free space 33 under the ring 14 in which ring 12 is free to laterally move. To aid the flow of the particles, air is admitted to air hammer cylinder 24. This causes abrupt, controlled, lateral movement of shank 19 which in turn causes ring 12 to move laterally on supports 13 and along the axis common to pin 17 and shank 19. Spring 27 causes a return movement of the moving mechanism. Thus a lateral, vibrating motion is caused in the regulator which shakes particles 11 and disturbs their normal angle of flow. By flattening this angle in the manner indicated, a more even flow of material will result. There is no material vibration of any other part of the bed than that contained within the limits of the regulator. Substantial savings may be accomplished by the use of this apparatus due to the more favorable flow characteristics of materials under the conditions described.

Where intermittent flow lifts are employed as in catalytic cracking units employing a mas flow lift, it would be advantageous to tie in the air supply to the cylinder 24 with the lift timer so that the vibrating action occurs only during the period of actual solids flow.

It is apparent that this apparatus may be adapted for use in a bin, kiln, column, reactor, reheater, or other vessel of like nature, whether of cylindrical shape or of any other. Bars 30 and 31 may be of any shape. The spacing of bars 30 must be sufficiently great as not to permit the regulator to support the bed and the orientation of these bars will depend on the frangibility of the material as hereinbefore set forth. The vibrator may be any suitable means of desirable frequency and may include an air hammer as described or other suitable means, including manual means.

While I have shown and described a preferred form of embodiment of my invention I am aware that modifications may be made thereto within the scope and spirit of the description herein and of the claim appended hereinafter.

I claim:

A granular solids flow promoter for a cylindrical vessel adapted to contain a gravity packed mass of particulate size solids to permit substantially uniform flow across the horizontal cross section of the vessel, which comprises an annular angle ring secured to the inner wall of the vessel and having an inwardly projecting flange which substantially establishes the cross sectional area of flow of the solids mass, an annular vertically extending ring of smaller diameter than the vessel but of larger diameter than the effective opening within the flange of the angle ring, means supporting the annular vertically extending ring for movement transverse of the vessel, a plurality of spaced bars extending across the last mentioned ring to maintain its shape, means for producing vibratory motion of said annular vertically extending ring in the direction of movement, said last mentioned ring being adapted to contain within its periphery a gravity packed segment of the solids within the vessel whereby on vibratory motion the normal submerged flow angle of particles is changed.

References Cited in the file of this patent

UNITED STATES PATENTS

| | | |
|---|---|---|
| 465,108 | Billing | Dec. 15, 1891 |
| 1,270,166 | Kempler | June 18, 1918 |
| 2,512,163 | Mallory | June 20, 1950 |
| 2,544,214 | Berg | Mar. 6, 1951 |